(12) United States Patent
Moore et al.

(10) Patent No.: US 11,900,263 B2
(45) Date of Patent: Feb. 13, 2024

(54) AUGMENTING NEURAL NETWORKS

(71) Applicant: Google LLC, Mountain View, CA (US)

(72) Inventors: Sherry Moore, Los Altos, CA (US);
Jeremiah Harmsen, Zurich (CH);
Noah Fiedel, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/972,492

(22) Filed: Oct. 24, 2022

(65) Prior Publication Data

US 2023/0119229 A1 Apr. 20, 2023

Related U.S. Application Data

(63) Continuation of application No. 16/645,441, filed as application No. PCT/US2018/050687 on Sep. 12, 2018, now Pat. No. 11,481,638.
(Continued)

(51) Int. Cl.
*G06N 3/10* (2006.01)
*G06F 8/34* (2018.01)
(Continued)

(52) U.S. Cl.
CPC ............ *G06N 3/105* (2013.01); *G06F 8/34* (2013.01); *G06F 18/214* (2023.01);
(Continued)

(58) Field of Classification Search
CPC .. G06K 9/6251; G06K 9/6256; G06K 9/6263; G06N 3/0445; G06N 3/0472; G06N 3/08
See application file for complete search history.

(56) References Cited

U.S. PATENT DOCUMENTS

| 6,128,606 A | 10/2000 | Bengio et al. |
| 2007/0211064 A1 | 9/2007 | Buck et al. |

(Continued)

FOREIGN PATENT DOCUMENTS

| CN | 105447498 A | 3/2016 |
| JP | 2017049907 A | 3/2017 |

OTHER PUBLICATIONS

Abadi et al., "TensorFlow: Large-Scale Machine Learning on Heterogeneous Distributed Systems", arXiv:1603.04467v2, Mar. 2016, 19 pages.
(Continued)

*Primary Examiner* — David Perlman
(74) *Attorney, Agent, or Firm* — Fish & Richardson P.C.

(57) ABSTRACT

Methods, systems, and apparatus, including computer programs encoded on computer storage media, for augmenting a neural network with additional operations. One of the methods includes maintaining, by a computational graph system that manages execution of computational graphs representing neural network operations for users of the computational graph system, data specifying a plurality of pre-trained neural networks, wherein each of the pre-trained neural networks is a neural network that has been trained on training data to determine trained values of the respective parameters of the neural network; obtaining data specifying a user computational graph representing neural network operations, the user computational graph comprising a plurality of nodes connected by edges; identifying (i) an insertion point after a first node in the user computational graph and (ii) a particular pre-trained neural network from the plurality of pre-trained neural networks; and inserting a remote call node into the user computational graph.

20 Claims, 3 Drawing Sheets

Related U.S. Application Data (60) Provisional application No. 62/559,463, filed on Sep. 15, 2017.

(51) Int. Cl.
  *G06N 3/08* (2023.01)
  *G06F 18/214* (2023.01)
  *G06F 18/2137* (2023.01)
  *G06F 18/21* (2023.01)
  *G06N 3/044* (2023.01)
  *G06N 3/047* (2023.01)

(52) U.S. Cl.
  CPC ...... *G06F 18/2137* (2023.01); *G06F 18/2178* (2023.01); *G06N 3/044* (2023.01); *G06N 3/047* (2023.01); *G06N 3/08* (2013.01)

(56) References Cited

U.S. PATENT DOCUMENTS

| | | |
|---|---|---|
| 2017/0124454 A1 | 5/2017 | Vasudevan et al. |
| 2018/0314945 A1 | 11/2018 | Breternitz et al. |
| 2019/0073580 A1 | 3/2019 | Dzhulgakov et al. |
| 2020/0175361 A1 | 6/2020 | Che et al. |

OTHER PUBLICATIONS

Al-Rfou et al., "Theano: A Python framework for fast computation of mathematical expressions", arXiv:1605.02688v1, May 2016, 19 pages.

Broll et al., "DeepForge: An open source, collaborative environment for reproducible deep learning", OpenReview, 2017, 9 pages.

De Coninck et al., "Dianne: Distributed Artificial Neural Networks for the Internet of Things," Proceedings of the 2nd Workshop on Middleware for Context-Aware Applications in the IoT, Jan. 2015, pp. 19-24.

hackaday.com [online], "Machine Learning Ide in Alpha", published on Jun. 27, 2017, retrieved on Dec. 13, 2018, retrieved from URL<https://hackaday.com/2017/06/27/machine-learning-ide-in-alpha/> 8 pages.

International Preliminary Report on Patentability in International Application No. PCT/US2018/050687, dated Mar. 26, 2020, 8 pages.

International Search Report and Written Opinion in International Application No. PCT/US2018/050687, dated Dec. 20, 2018, 14 pages.

Office Action in Chinese Appln. No. 201880059961.6, dated Mar. 25, 2023, 24 pages (with English Translation).

Office Action in European Appln. No. 187925771, dated Dec. 21, 2022, 10 pages.

Sankaran et al., "Darviz: Deep Abstract Representation, Visualization, and Verification of Deep Learning Models", arXiv:1708.04915v1, Aug. 2017, 4 pages.

Wongsuphasawat et al., "Visualizing Dataflow graphs of deep learning models in TensorFlow", IEEE Transactions on Visualization and Computer Graphics, 2017, 24(1):1-12.

Office Action in Chinese Appln. No. 201880059961.6, dated Nov. 4, 2023, 23 pages (with English Translation).

FIG. 3 ial Application No. 62/559,463, filed Sep. 15, 2017. The disclosures of the prior applications are considered part of and are incorporated by reference in the disclosure of this application.

AUGMENTING NEURAL NETWORKS

CROSS-REFERENCE TO RELATED APPLICATIONS

This application is a continuation application of, and claims priority to, U.S. patent application Ser. No. 16/645,441, filed on Mar. 6, 2020, which is a national stage application under § 371 and which claims priority to International Application No. PCT/US2018/050687, filed on Sep. 12, 2018, which claims the benefit under 35 U.S.C. § 119(e) of U.S. Provisional Application No. 62/559,463, filed Sep. 15, 2017. The disclosures of the prior applications are considered part of and are incorporated by reference in the disclosure of this application.

BACKGROUND

This specification relates to processing inputs using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

Some neural networks are recurrent neural networks. A recurrent neural network is a neural network that receives an input sequence and generates an output sequence from the input sequence. In particular, a recurrent neural network uses some or all of the internal state of the network after processing a previous input in the input sequence in generating an output from the current input in the input sequence.

SUMMARY

This specification describes how a system implemented as computer programs on one or more computers in one or more locations can augment a computational graph representing neural network operations with operations performed by a different, separately trained neural network.

Particular embodiments of the subject matter described in this specification can be implemented so as to realize one or more of the following advantages. A user computational graph can be augmented with a trained neural network such that, when the system executes the user computational graph, the operations of the trained neural network are performed at the appropriate points during execution, but the architecture and trained parameter values of the trained neural network are not transparent to the user. Accordingly, the system can offer functionality of a library of pre-trained neural networks without disclosing to users of the system the details of the operation of the neural networks. This may make the process of the user interacting with the system to specify the user computational graph, more straightforward and less time-consuming, since the user does not have to specify low-level neural structure within the user computational graph to carry out the functions performed by the pre-trained network. Thus, the disclosure makes possible an improved user interface.

Moreover, because the neural networks may have already been fully or partially trained, the system can reduce the computational resources necessary to train user neural networks, i.e., because multiple user computational graphs can make use of the same trained neural network without needing to re-train the trained neural network from scratch for each user.

Moreover, by incorporating pre-trained state-of-the-art neural networks into user computational graphs, the performance of the user neural networks can be improved without the system needing to allocate additional resources to training the user neural networks or needing to transmit large amounts of data, i.e., training data, over the network to and from the users.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a computational graph system that maintains machine learning models as computational graphs.

A computational graph includes nodes connected by directed edges. Each node in the computational graph represents an operation. An incoming edge to a node represents a flow of an input into the node, i.e., an input to the operation represented by the node. An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

Generally, the input and outputs flowing along directed edges in the computational graph are tensors. A tensor is a multidimensional array of numeric or other values, e.g., strings, having a specific order that corresponds to the dimensionality of the array. For example, a scalar value is a 0th-order tensor, a vector of numeric values is a 1st-order tensor, and a matrix is a 2nd-order tensor.

As indicated above, the operations represented in a given computational graph are neural network operations or operations for a different kind of machine learning model. A neural network is a machine learning model that employs one or more layers of nonlinear units to predict an output for a received input. Some neural networks are deep neural networks that include one or more hidden layers in addition to an output layer. The output of each hidden layer is used as input to another layer in the network, i.e., another hidden layer, the output layer, or both. Some layers of the network generate an output from a received input in accordance with current values of a respective set of parameters, while other layers of the network may not have parameters.

For example, the operations represented by the computational graph may be operations necessary for the neural network to compute an inference, i.e., to process an input through the layers of the neural network to generate a neural network output for the input. As another example, the operations represented by the computational graph may be operations necessary to train the neural network by performing a neural network training procedure to adjust the values of the parameters of the neural network, e.g., to determine trained values of the parameters from initial values of the parameters. In some cases, e.g., during training of the neural network, the operations represented by the computational graph can include operations performed by multiple replicas of the neural network.

By way of illustration, a neural network layer that receives an input from a previous layer can use a parameter matrix to perform a matrix multiplication between the parameter matrix and the input. In some cases, this matrix multiplication can be represented as multiple nodes in the computational graph. For example, a matrix multiplication can be divided into multiple multiplication and addition operations, and each operation can be represented by a different node in the computational graph. The operation represented by each node can generate a respective output, which flows on a directed edge to a subsequent node. After the operation represented by a final node generates a result of the matrix multiplication, the result flows, on a directed edge, to another node. The result is equivalent to an output of the neural network layer that performs the matrix multiplication.

In some other cases, the matrix multiplication is represented as one node in the graph. The operations represented by the node can receive, as inputs, an input tensor on a first directed edge and a weight tensor, e.g., a parameter matrix, on a second directed edge. The node can process, e.g., perform a matrix multiplication of, the input and weight tensors to output, on a third directed edge, an output tensor, which is equivalent to an output of the neural network layer.

Other neural network operations that may be represented by nodes in the computational graph include other mathematical operations, e.g., subtraction, division, and gradient computations; array operations, e.g., concatenate, splice, split, or rank; and neural network building block operations, e.g., SoftMax, Sigmoid, rectified linear unit (ReLU), or convolutions.

Figure 1:
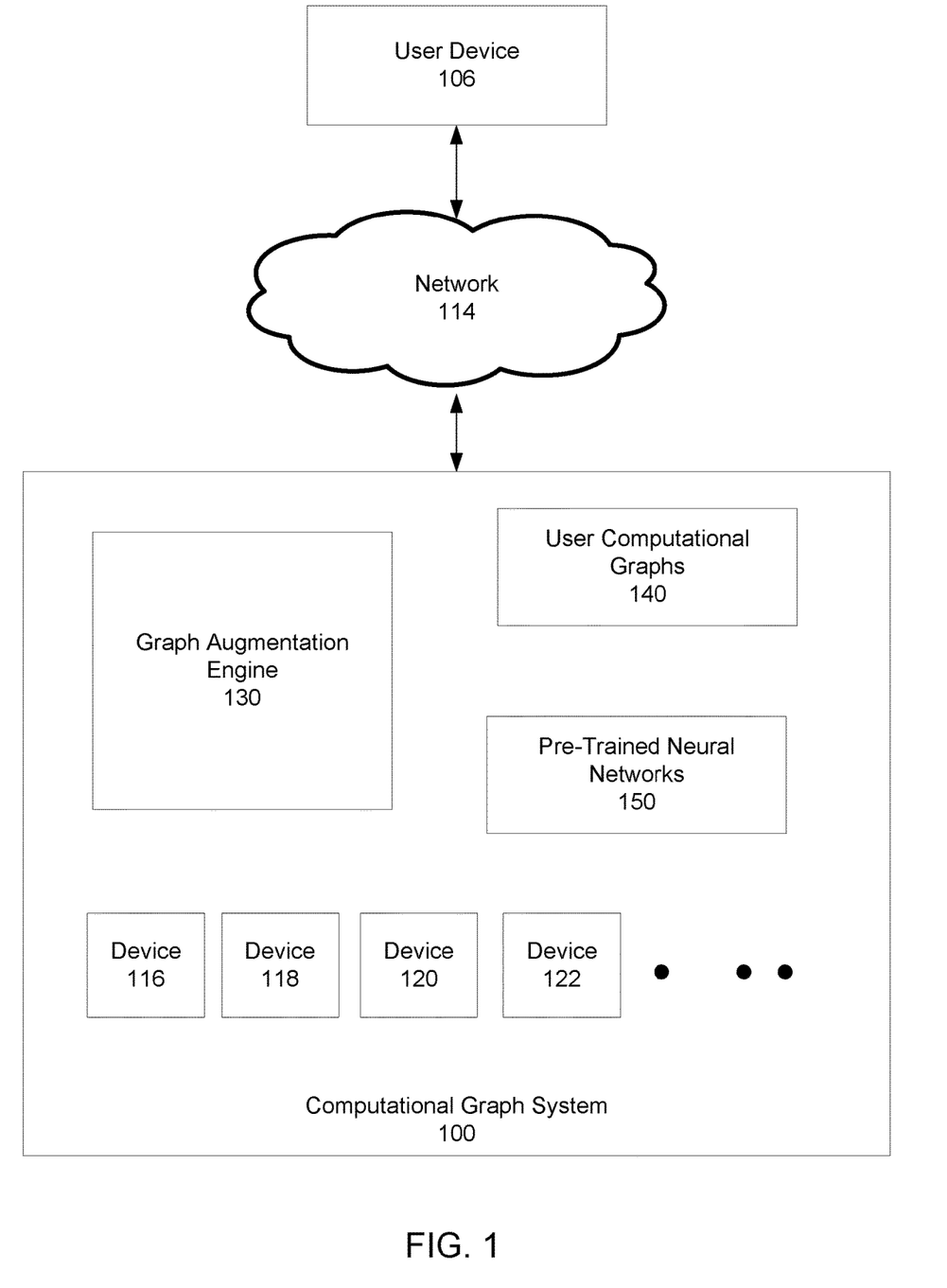
FIG. 1 shows an example computational graph system.

FIG. 1 shows an example computational graph system 100. The system 100 is an example of a system implemented as computer programs on one or more computers in one or more locations, in which the systems, components, and techniques described below can be implemented.

Generally, the computational graph system 100 maintains user computational graphs 140 and executes the user computational graphs on devices available to the system, e.g., devices 116-122. The devices 116-122 can be any of a variety of devices capable of performing neural network operations, e.g., Graphical Processing Units (GPUs), Central Processing Units (CPUs), or special-purpose neural network hardware accelerators.

For example, the system 100 can maintain a framework that allows users to create and upload computational graphs representing neural network operations for execution by the system 100. An example of a framework that specifies neural network operations as computational graphs is the TensorFlow framework, described in Abadi, et al, TensorFlow: Large-Scale Machine Learning on Heterogeneous Distributed Systems, available at https://arxiv.org/abs/1603.04467.

A user of a user device 106 can request, e.g., using the framework and over a data communication network 114, operations to be performed on a computational graph representing neural network operations. To perform these operations, the computational graph is executed. As part of the request, the user device 106 provides data identifying a computational graph to the system 100, i.e., identifying a particular computational graph from the maintained user computational graphs 140 or a new computational graph to be added to the maintained user computational graphs 140, and specifies types of operations to be performed on the computational graph.

For example, the request can identify a computational graph representing operations necessary to perform an inference for a particular neural network, i.e., to generate an output using the particular neural network, and can identify an input on which the inference should be performed.

As another example, the request can identify a computational graph representing a training procedure for a particular neural network and can identify an input, i.e., training data, on which the training should be performed. That is, the graph includes operations necessary to perform an inference using the particular neural network as well as operations necessary to determine updates to the parameters of the neural network using the training procedure. In this example, when receiving a request to process a computational graph representing a training procedure, the system 100 can determine modified values for parameters of the neural network by executing the computational graph.

In some cases, the request may specify a response that should be transmitted in response to the request. For example, for a neural network training request, the user device 106 can request an indication that the requested neural network training operations have been completed and, optionally, trained values of the parameters of the neural network or an indication of a memory location from which the trained values can be accessed by the user device 106. As another example, for a neural network inference request, the user device 106 can request output values that represent an inference operation from one or more particular output nodes of the identified computational graph.

The system 100 can then execute the request, i.e., by executing the identified computational graph on the identified inputs, and, if requested, provide the response to the user device. In particular, once a user has uploaded or created a user computational graph, the user may be able to submit a request to the system 100 over the data communication network 114 by providing input data as part of making an Application Programming Interface (API) call to the system 100. In response to the API call, the system 100 can generate an output by executing the user computational graph and transmit the output to the user device 106 over the data communication network 114.

The system 100 also maintains a collection of trained neural networks 150. Each of the trained neural networks in the collection is a neural network that has been trained on training data to determine trained values of the parameters of the neural network. Generally, each of the trained neural networks is configured to perform a respective machine learning task, i.e., to receive a respective type of network input and to generate a respective type of network output.

For example, one or more of the neural networks in the collection may have been trained to classify input images, e.g., to receive an input image of a particular size, i.e., an x by y by z tensor of color values, and to generate an output vector that includes a respective score for each of multiple object categories.

As another example, one or more of the neural networks in the collection may have been trained to generate an embedding of a particular type of input, e.g., a word, a phrase, an image, or a video. An embedding is a numeric representation of the input in an embedding space, e.g., a vector of floating point values or of quantized floating point values.

As another example, one or more of the neural networks in the collection may have been trained to translate a sequence of text in a source language into a sequence of text in a target language.

For each trained neural network, the maintained data includes sufficient data for the system to process an input to the trained neural network in accordance with the trained values of the parameters of the neural network, i.e., data specifying the architecture of the trained neural network and the trained values of the parameters of the neural network. Because the system is configured to perform computations by executing computational graphs, the maintained data is generally sufficient for the system to instantiate a computational graph representing the trained neural network. For example, the maintained data can include data in a structured format, e.g., protocol buffers, that identifies, for each node of the computational graph, inputs and outputs to the node and the computation performed by the node.

The system 100 also includes a graph augmentation engine 130 that, in response to user requests, augments a user computational graph 140 with a pre-trained neural network 150. That is, the graph augmentation engine 130 can modify a user computational graph to also include the operations performed by a pre-trained neural network from the collection 150.

In particular, as will be described in more detail below, the graph augmentation engine 130 can augment the user computational graph by inserting a node to the user computational graph that, when executed, provides an input to a pre-trained neural network, obtains an output from the pre-trained neural network, and then provides the output as an output of the node in the user computational graph, i.e., to another node that is connected to the node by an edge in the user computational graph or as the output of the user computational graph.

Figure 2:
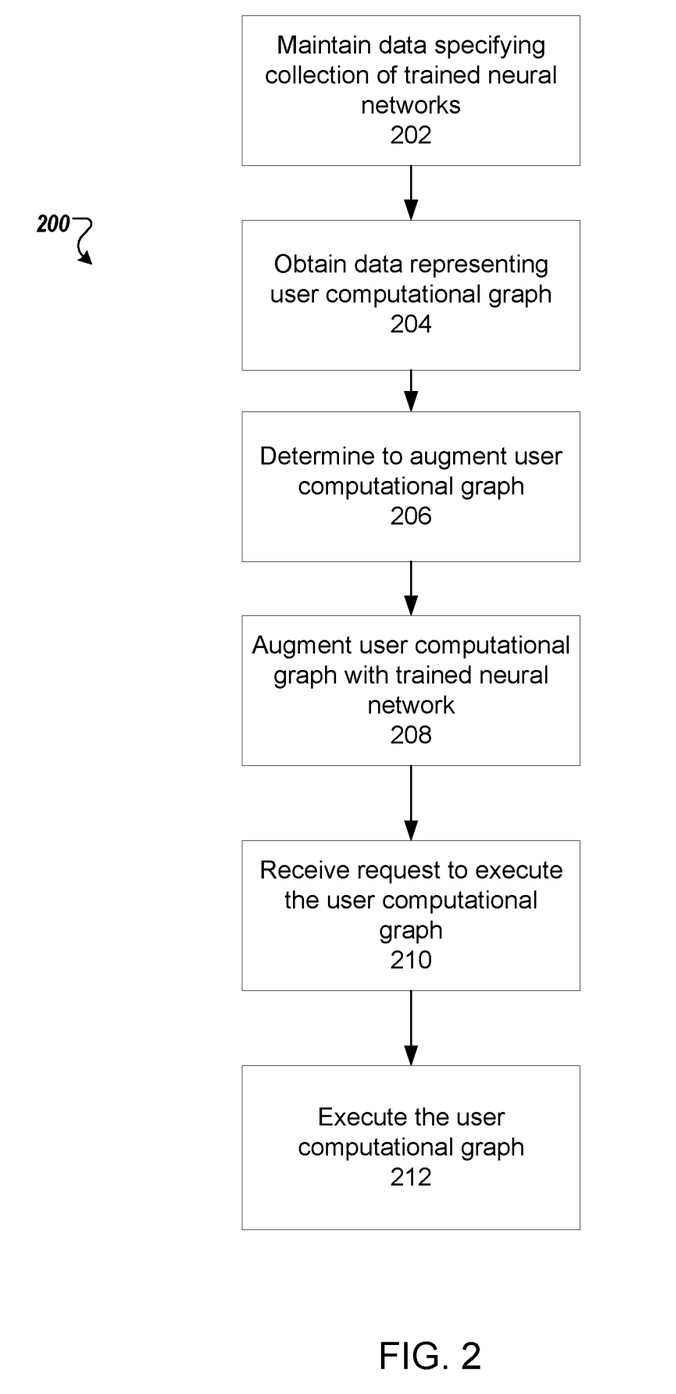
FIG. 2 is a flow diagram of an example process for augmenting a user computational graph.

FIG. 2 is a flow diagram of an example process 200 for augmenting a computational graph to include a trained neural network. For convenience, the process 200 will be described as being performed by a system of one or more computers, located in one or more locations, and programmed appropriately in accordance with this specification. For example, a computational graph system, e.g., the computational graph system 100 of FIG. 1, appropriately programmed, can perform the process 200.

The system maintains data specifying a collection of trained neural networks (step 202).

As described above, each of the trained neural networks in the collection is a neural network that has been trained on training data to determine trained values of the parameters of the neural network. Generally, each of the trained neural networks is configured to perform a respective machine learning task, i.e., to receive a respective type of network input and to generate a respective type of network output.

The system obtains, from a user of the system, data representing a user computational graph of nodes and directed edges (204). For example, the user can upload computational graph data from a user device and to the system over a data communication network. As another example, the system can present a user interface to the user device through which the user can submit inputs specifying the computational graph, i.e., inputs defining the nodes and edges of the user computational graph.

The user computational graph is a computational graph to be maintained and executed by the system, i.e., to be executed by the system on devices that are managed by the system and that are generally remote from the user device of the user. A "remote" device means one having a processor external to a first device (e.g., the user device), e.g., within a separate exterior housing from an exterior housing of the first device. Typically, a remote device communicates with the first device over a communications network and/or it includes a processor operating based on a clock signal which is not used in the first device.

For example, when the user computational graph is a computational graph that represents neural network inference operations, i.e., operations for processing one or more network inputs through a neural network to generate a respective network output for each of the network inputs, the user may provide network inputs to the system for processing by the neural network. The system can then perform the operations specified by the user computational graph on each network input to generate a network output and then provide the network outputs to the user.

As another example, when the user computational graph is a computational graph that represents neural network training operations, i.e., operations for training a neural network on training data, the user can provide training data to the system over the network and the system can train the neural network on the training data by executing the computational graph. Once the neural network has been trained, the system can provide data specifying the trained parameter values of the neural network to the user or can execute an inference graph for the trained neural network to generate network outputs for network inputs provided by the user.

The system determines that the user computational graph needs to be augmented with one of the trained neural networks in the collection of trained neural networks (206).

In some implementations, the system makes this determination based at least in part on user input. For example, the user may submit an input to the system that specifies an insertion point in the user computational graph, i.e., a source node in the user computational graph that generates the output that should be provided as input to the trained neural network and a destination for the output of the trained neural network, i.e., another node in the user computational graph or an output of the user computational graph. In some examples, the system can then present a user interface that allows the user to select a neural network from the trained neural networks in the collection to be added to the user computational graph at the insertion point. In other examples, the system can analyze the collection of trained neural networks to identify any neural networks in the collection that conform to the insertion point. A neural network conforms to the insertion point if it takes inputs that have the same dimensions and size as the output tensor generated by the source node in the user computational graph and that generate outputs that have the same dimensions and size that are required by the destination in the user computational graph.

In some implementations, the system can analyze the user computational graph and identify a portion, i.e., a sub-graph of one or more nodes, of the user computational graph that should be replaced by one of the neural networks in the collection of trained neural networks. For example, the system can analyze the user computational graph for subgraphs that generate outputs and receive inputs that conform to the outputs and inputs of a trained neural network in the computational graph. In these implementations, the insertion point would be a connection between the input edge to the identified sub-graph and the output edge of the identified sub-graph. The system can then prompt the user to replace the identified sub-graph of the user computational graph with the trained neural network.

The system augments the user computational graph with the trained neural network (208).

Generally, the system augments the user computational graph with the trained neural network such that, when the system executes the user computational graph (e.g., by inputting data into the user computational graph; the data input to the user computational graph is referred to as a "graph input"), the operations of the trained neural network are performed at the appropriate points during execution, but the architecture and trained parameter values of the trained neural network are not transparent to the user. That is, the system may not transmit or make accessible to the user sufficient data to determine the architecture and/or trained parameter values. Indeed, preferably the system does not output sufficient such data at all, e.g., not to a user viewing a representation of the user computational graph in a user interface.

In particular, the system includes a reference to the trained neural network at the insertion point in the user computational graph. At runtime of the user computational graph, the system resolves the reference to bind the user computational graph to an input node to the graph representing the trained neural network, i.e., so that the tensor generated as output by the particular node in the user computational graph is provided as input to the input node in the graph representing the trained neural network and the output tensor generated by the output node in the graph representing the trained neural network is provided as input to the appropriate node in the user computational graph or, in some cases, as the output of the user computational graph.

In some implementations, the included reference is a remote call node inserted into the user computational graph at the insertion point. A remote call node in a computational graph is a node that, when the computational graph is executed, receives an input flowing along the incoming edge to the remote call node and issues a remote call with the input. As used in this specification, a remote call is a request that triggers the system to execute a computational graph that (i) is identified by the remote call, (ii) is different from the graph in which the remote call node is included, and (iii) that takes as input a tensor included with the remote call and to return in response to the request the result of executing the computational graph, i.e., the output of one or more particular output nodes in the identified computational graph. The remote call node then waits until an output is received from the remote graph in response to the remote call and provides the received output along the outgoing edge(s) of the remote call node. In particular, the remote graph is the computational graph representing the trained neural network. Thus, because the remote call node calls a remote graph and receives an output from the remote graph, the node structure and operations performed by the remote graph are not available when accessing, i.e., viewing, the user computational graph in which the remote call node is included or when submitting inputs to be processed by the user computational graph. In some implementations, the remote call node identifies the trained neural network by pointing to a graph identifier of the graph representing the trained neural network and a production environment for executing the identified graph.

In some implementations, the system maintains a single instance of the computational graph representing the trained neural network and resolves requests from multiple user computational graphs to the same instance. In other implementations, the system resolves requests from each user computational graph to a different instance of the computational graph representing the trained neural network.

The system receives a request to execute the user computational graph (step 210). For example, the system can receive a network input and a request to generate a network output for the network input.

The system executes the user computational graph augmented with the trained neural network (step 212).

That is, the system executes the user computational graph and, because the user computational graph includes the reference to the trained neural network, the execution causes an input tensor to the included reference, e.g., to the remote call node, to be passed to the trained neural network and the output generated by the trained neural network to be passed as input to the appropriate portion of the user computational graph.

In particular, when the system receives the call identifying the trained neural network, the system can, remotely from the execution of the user computational graph, execute a computational graph representing the trained neural network (the "remote graph") on the input tensor to generate an output tensor, and then provide the output tensor in response to the remote call.

Generally, when the user computational graph is a computational graph for training neural network (a "training graph"), the system would adjust the values of the parameters of the neural network during the training procedure, i.e., during execution of the training graph. In particular, training graphs generally include a forward path for computing an output in accordance with current values of the parameters of the neural network based on a received input and a backward path for updating the current parameter values based on a loss between the generated output and a known output for the generated input. When the user computational graph is a training graph, the system can insert call nodes at appropriate points in both the forward and backward paths of the user training graph.

In some implementations, the system holds the parameters of the trained neural network fixed during execution of the training graph.

In other implementations, the system can also adjust the values of the parameters of the trained neural network. For example, the system can train the trained neural network for "fine-tuning", with a reduced learning rate from the rest of the user computational graph. As another example, the system can train the trained neural network with the same learning rate. The system can train the trained neural network by passing gradient values as a remote call as input to a backward/training path through the remote graph and providing gradient values from the remote graph as input to the appropriate location in the backward path through the user computational graph. In these cases, by fine-tuning the already-trained neural network, the system allows the performance of the trained neural network to be customized for the training data and task specified by the user while still leveraging the already high-quality performance afforded by the pre-training. Additionally, the performance of the user computational graph is improved without either the original or fine-tuned parameter values of the trained neural network being transparent to the user.

Figure 3:
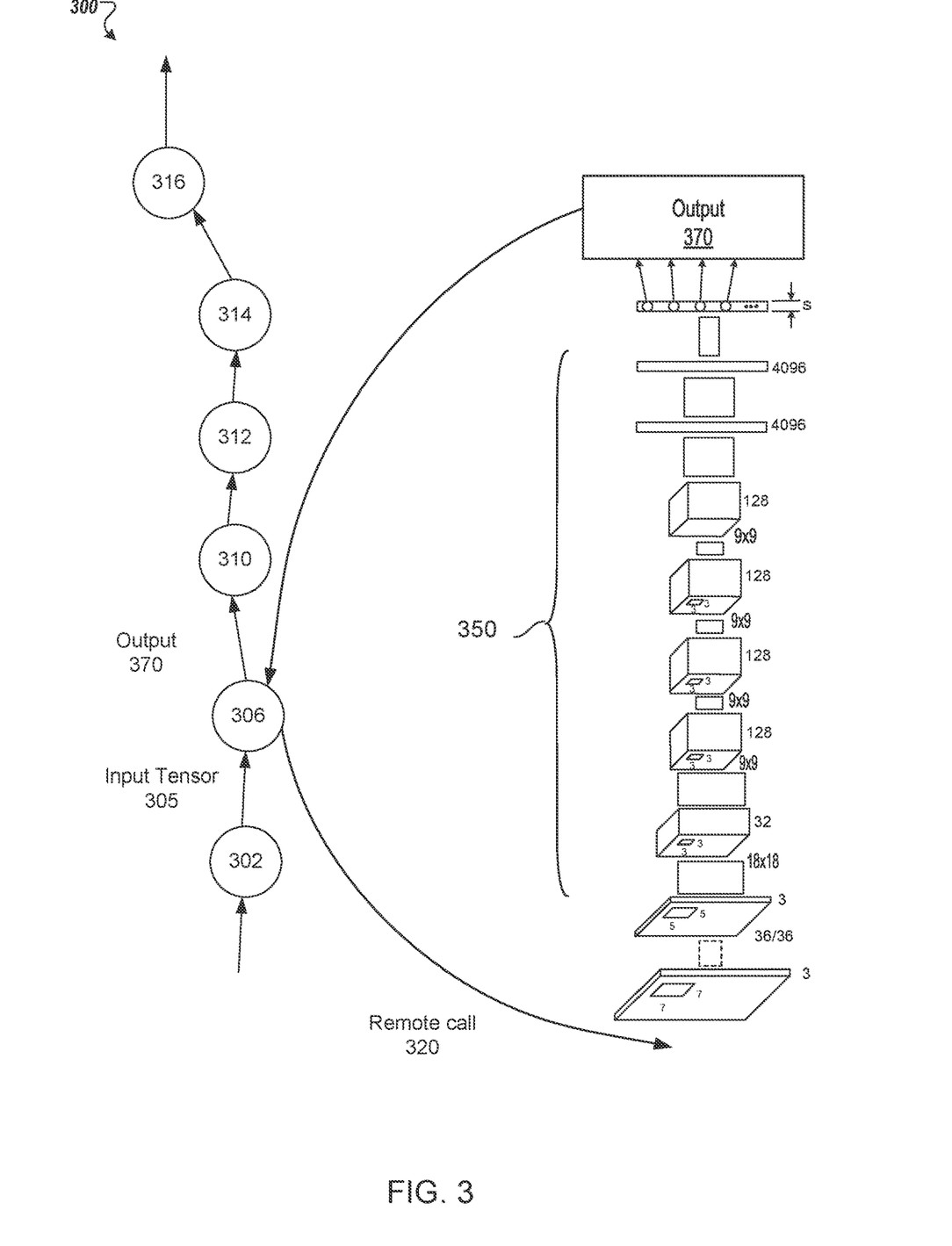
FIG. 3 shows an example augmented user computational graph.

FIG. 3 illustrates an example computational graph 300 that has been augmented with a remote call node 306. In addition to the remote call node 302, the computational graph also includes nodes, 302, 310, 312, 314, and 316. As a simplified example, a computational graph system, e.g., the system 100 of FIG. 1, can receive a request from a user to, given a set of inputs, compute an inference using the computational graph. In particular, the client can request an output of node 316 of the graph 300. The set of inputs can be provided on a directed edge to the node 302 of the graph 300.

During execution of the graph 300, the remote call node receives an input tensor 305 generated as output of the node 302 and provides an output tensor 370 as input to the node 310. In particular, upon receiving the input tensor 305, the remote call node 320 issues a remote call to a graph representing a trained neural network 350. In the example of FIG. 3, the trained neural network 350 is a convolutional neural network that receives the input tensor 305 and generates the output tensor 370, e.g., a classification or an embedding of the input tensor 305.

Upon receiving the output tensor 370 from the trained neural network 350, the remote call node 306 provides the output tensor 370 as input to the node 310. Because the call is remote, i.e., not local to the user computation graph, the architecture and the trained parameter values do not become known to the owner of the user computational graph.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
maintaining, by a computational graph system that manages execution of computational graphs representing neural network operations for users of the computational graph system, data specifying a plurality of pre-trained neural networks, wherein each of the pre-trained neural networks is a neural network that has been trained on training data to determine trained values of respective parameters of the neural network;
obtaining data specifying a user computational graph representing neural network operations, the user computational graph comprising a plurality of nodes connected by edges;
modifying the user computational graph by modifying a subgraph of the user computational graph using a particular pre-trained neural network from the plurality of pre-trained neural networks, comprising:
identifying the subgraph of the user computational graph, wherein the subgraph of the user computational graph receives a subgraph input, and generates a subgraph output after processing the subgraph input, wherein the subgraph output is provided as an input to a succeeding node in the user computational graph;
selecting the particular pre-trained neural network from the plurality of pre-trained neural networks, wherein the particular pre-trained neural network receives an input conforming to the subgraph input, and generates an output conforming to the subgraph output; and
replacing the subgraph with the particular pre-trained neural network by inserting a remote call node into the user computational graph to modify the user computational graph, wherein the remote call node is configured to, during execution of the modified user computational graph:
receive data representing the subgraph input,
provide, using a remote call, the subgraph input as an input to the particular pre-trained neural network,
obtain, in response to the remote call, a remote output generated by the particular pre-trained neural network for the subgraph input, and
provide, as the subgraph output, the remote output generated by the particular pre-trained neural network to the succeeding node; and
storing the modified user computational graph in a memory device.

2. The method of claim 1, further comprising:
receiving a graph input to the modified user computational graph; and
executing the modified user computational graph to process the graph input.

3. The method of claim 1, wherein the neural network operations represented by the user computational graph are inference operations for a first neural network.

4. The method of claim 1, wherein the neural network operations represented by the user computational graph are training operations for training a first neural network.

5. The method of claim 1, wherein the input conforms to the subgraph input such that the input has the same dimensions and size as the subgraph input, and the output conforms to the subgraph output such that the output has the same dimensions and size as the subgraph output.

6. The method of claim 1, further comprising:
during execution of the modified user computational graph, receiving the remote call generated by the remote call node; and
in response to the remote call:
processing, as the input, the subgraph input provided by the remote call by executing operations associated with the particular pre-trained neural network to generate a network output for the input; and
providing, as the remote output, the generated network output in response to the remote call.

7. The method of claim 1, wherein an architecture and trained parameter values of the particular trained neural network are not made accessible to a user providing a graph input to the user computational graph.

8. The method of claim 1, wherein an architecture and trained parameter values of the particular trained neural network are not made accessible to a user viewing a representation of the user computational graph in a user interface.

9. A system comprising:
one or more computers and one or more storage devices storing instructions that, when executed by the one or more computers, cause the one or more computers to perform operations comprising:
maintaining, by a computational graph system that manages execution of computational graphs representing neural network operations for users of the computational graph system, data specifying a plurality of pre-trained neural networks, wherein each of the pre-trained neural networks is a neural network that has been trained on training data to determine trained values of respective parameters of the neural network;
obtaining data specifying a user computational graph representing neural network operations, the user computational graph comprising a plurality of nodes connected by edges;
modifying the user computational graph by modifying a subgraph of the user computational graph using a particular pre-trained neural network from the plurality of pre-trained neural networks, comprising:
identifying the subgraph of the user computational graph, wherein the subgraph of the user computational graph receives a subgraph input, and generates a subgraph output after processing the subgraph input, wherein the subgraph output is provided as an input to a succeeding node in the user computational graph;
selecting the particular pre-trained neural network from the plurality of pre-trained neural networks, wherein the particular pre-trained neural network receives an input conforming to the subgraph input, and generates an output conforming to the subgraph output; and
replacing the subgraph with the particular pre-trained neural network by inserting a remote call node into the user computational graph to modify the user computational graph, wherein the remote call node is configured to, during execution of the modified user computational graph:
receive data representing the subgraph input,
provide, using a remote call, the subgraph input as an input to the particular pre-trained neural network,
obtain, in response to the remote call, a remote output generated by the particular pre-trained neural network for the subgraph input, and
provide, as the subgraph output, the remote output generated by the particular pre-trained neural network to the succeeding node; and
storing the modified user computational graph in a memory device.

10. The system of claim 9, wherein the operations further comprise:
receiving a graph input to the modified user computational graph; and
executing the modified user computational graph to process the graph input.

11. The system of claim 9, wherein the neural network operations represented by the user computational graph are inference operations for a first neural network.

12. The system of claim 9, wherein the neural network operations represented by the user computational graph are training operations for training a first neural network.

13. The system of claim 9, wherein the input conforms to the subgraph input such that the input has the same dimensions and size as the subgraph input, and the output conforms to the subgraph output such that the output has the same dimensions and size as the subgraph output.

14. The system of claim 9, wherein the operations further comprise:

during execution of the modified user computational graph, receiving the remote call generated by the remote call node; and in response to the remote call:

processing, as the input, the subgraph input provided by the remote call by executing operations associated with the particular pre-trained neural network to generate a network output for the input; and providing, as the remote output, the generated network output in response to the remote call.

15. The system of claim 9, wherein an architecture and trained parameter values of the particular trained neural network are not made accessible to a user providing a graph input to the user computational graph.

16. The system of claim 9, wherein an architecture and trained parameter values of the particular trained neural network are not made accessible to a user viewing a representation of the user computational graph in a user interface.

17. One or more non-transitory computer storage media encoded with instructions that, when executed by one or more computers, cause the one or more computers to perform operations comprising:

maintaining, by a computational graph system that manages execution of computational graphs representing neural network operations for users of the computational graph system, data specifying a plurality of pre-trained neural networks, wherein each of the pre-trained neural networks is a neural network that has been trained on training data to determine trained values of respective parameters of the neural network;

obtaining data specifying a user computational graph representing neural network operations, the user computational graph comprising a plurality of nodes connected by edges;

modifying the user computational graph by modifying a subgraph of the user computational graph using a particular pre-trained neural network from the plurality of pre-trained neural networks, comprising:

identifying the subgraph of the user computational graph, wherein the subgraph of the user computational graph receives a subgraph input, and generates a subgraph output after processing the subgraph input, wherein the subgraph output is provided as an input to a succeeding node in the user computational graph;

selecting the particular pre-trained neural network from the plurality of pre-trained neural networks, wherein the particular pre-trained neural network receives an input conforming to the subgraph input, and generates an output conforming to the subgraph output; and replacing the subgraph with the particular pre-trained neural network by inserting a remote call node into the user computational graph to modify the user computational graph, wherein the remote call node is configured to, during execution of the modified user computational graph:

receive data representing the subgraph input, provide, using a remote call, the subgraph input as an input to the particular pre-trained neural network, obtain, in response to the remote call, a remote output generated by the particular pre-trained neural network for the subgraph input, and provide, as the subgraph output, the remote output generated by the particular pre-trained neural network to the succeeding node; and storing the modified user computational graph in a memory device.

18. The one or more non-transitory computer storage media of claim 17, wherein the operations further comprise:

receiving a graph input to the modified user computational graph; and executing the modified user computational graph to process the graph input.

19. The one or more non-transitory computer storage media of claim 17, wherein the neural network operations represented by the user computational graph are inference operations for a first neural network.

20. The one or more non-transitory computer storage media of claim 17, wherein the neural network operations represented by the user computational graph are training operations for training a first neural network.

* * * * *